(12) United States Patent
Vidal et al.

(10) Patent No.: US 9,003,389 B2
(45) Date of Patent: *Apr. 7, 2015

(54) GENERATING AN ENCODED PACKAGE PROFILE BASED ON EXECUTING HOST PROCESSES

(75) Inventors: Seth Kelby Vidal, Raleigh, NC (US); James Antill, Bristol, CT (US)

(73) Assignee: Red Hat, Inc., Raleigh, NC (US)

( * ) Notice: Subject to any disclaimer, the term of this patent is extended or adjusted under 35 U.S.C. 154(b) by 688 days.

This patent is subject to a terminal disclaimer.

(21) Appl. No.: 12/787,104

(22) Filed: May 25, 2010

(65) Prior Publication Data

US 2011/0296393 A1  Dec. 1, 2011

(51) Int. Cl.
| G06F 9/44 | (2006.01) |
|---|---|
| G06F 9/455 | (2006.01) |
| G06F 9/45 | (2006.01) |
| G06F 9/445 | (2006.01) |

(52) U.S. Cl.
CPC ............ *G06F 9/45533* (2013.01); *G06F 8/453* (2013.01); *G06F 8/65* (2013.01)

(58) Field of Classification Search
CPC ....................................................... G06F 8/65
USPC ................................................. 717/168–178
See application file for complete search history.

(56) References Cited

U.S. PATENT DOCUMENTS

| 5,845,077 | A | * | 12/1998 | Fawcett ......................... 709/221 |
|---|---|---|---|---|
| 6,438,749 | B1 | | 8/2002 | Chamberlain |
| 6,802,061 | B1 | * | 10/2004 | Parsarathy et al. ........... 717/173 |
| 6,829,732 | B2 | * | 12/2004 | Whiteside et al. ........... 714/38.1 |
| 7,240,336 | B1 | | 7/2007 | Baker |
| 7,512,939 | B2 | | 3/2009 | Brookner |
| 7,624,393 | B2 | | 11/2009 | Egan et al. |
| 7,657,885 | B2 | | 2/2010 | Anderson |
| 7,836,341 | B1 | | 11/2010 | Krishnan |
| 2003/0051235 | A1 | | 3/2003 | Simpson |
| 2003/0229890 | A1 | | 12/2003 | Lau et al. |
| 2004/0044996 | A1 | * | 3/2004 | Atallah ......................... 717/169 |
| 2004/0181790 | A1 | * | 9/2004 | Herrick ......................... 717/174 |
| 2005/0120346 | A1 | * | 6/2005 | Sprigg .......................... 717/176 |
| 2005/0125525 | A1 | * | 6/2005 | Zhou et al. .................... 709/223 |

(Continued)

OTHER PUBLICATIONS

Hollingsworth et al., Using Content-Derived Names for Configuration Management, 1997 ACM, pp. 104-109.*

(Continued)

*Primary Examiner* — Satish Rampuria
(74) *Attorney, Agent, or Firm* — Lowenstein Sandler LLP (57) ABSTRACT

Embodiments relate to generating an encoded package profile based on executing host processes. A physical or virtual client machine can host a set of installed software packages, including operating system, application, and/or other software. A package manager tracks the set of installed packages and updates available for the installed set. The package manager and/or other logic can identify currently executing processes on the client, and determine which package(s) corresponding to that set of executing processes are hosted on the client. The package manager can generate a report to a package server and/or other remote management platform to perform management operations on the client, such as, for example, to terminate executing processes on a target client to permit package update processes to take place. Other network management actions, such as inventorying or grouping virtual machines in a cloud or other network, can likewise be performed.

20 Claims, 5 Drawing Sheets

(56) References Cited

U.S. PATENT DOCUMENTS

| | | | |
|---|---|---|---|
| 2005/0210459 | A1 | 9/2005 | Henderson et al. |
| 2006/0190773 | A1 | 8/2006 | Rao et al. |
| 2006/0230398 | A1 | 10/2006 | Yokota |
| 2006/0271916 | A1* | 11/2006 | Abe .............................. 717/128 |
| 2007/0038991 | A1 | 2/2007 | Schuft et al. |
| 2007/0157192 | A1 | 7/2007 | Hoefler et al. |
| 2007/0169075 | A1 | 7/2007 | Lill et al. |
| 2008/0134165 | A1 | 6/2008 | Anderson et al. |
| 2008/0141240 | A1* | 6/2008 | Uthe .............................. 717/174 |
| 2008/0201705 | A1* | 8/2008 | Wookey ........................ 717/175 |
| 2009/0013319 | A1 | 1/2009 | Williams et al. |
| 2009/0037897 | A1 | 2/2009 | Dull et al. |
| 2009/0300595 | A1 | 12/2009 | Moran et al. |
| 2010/0023933 | A1 | 1/2010 | Bryant et al. |
| 2010/0058308 | A1 | 3/2010 | Demshur et al. |
| 2010/0058314 | A1 | 3/2010 | Wang |
| 2010/0083243 | A1 | 4/2010 | Mincarelli et al. |
| 2010/0313196 | A1* | 12/2010 | De Atley et al. .............. 717/174 |
| 2011/0010699 | A1* | 1/2011 | Cooper et al. ................. 717/169 |
| 2011/0214118 | A1* | 9/2011 | Antill et al. .................... 717/174 |

OTHER PUBLICATIONS

Duvos et al., An Infrastructure for the Dynamic Distribution of Web Applications and Services, Department of Computer Science Boston University, Dec. 2000, pp. 1-22.*

Hall et al., Software Deployment Languages and Schema, Department of Computer Science University of Colorado 1997, pp. 1-13.*

Hughes, G.; Al-Jumeily, D.; Hussain, A.J., "Research, design and development review of the Cloud Computing Management System (CCMS)," Internet Technology and Secured Transactions (ICITST), 2011 International Conference for, pp. 128-131, Dec. 11-14, 2011.*

Thiruvathukal, G.K., "Gentoo Linux: the next generation of Linux," Computing in Science & Engineering, vol. 6, No. 5, pp. 66-74, Sep.-Oct. 2004.*

Sun, C.; Le He; Qingbo Wang; Willenborg, R., "Simplifying Service Deployment with Virtual Appliances," Services Computing, 2008. SCC '08. IEEE International Conference on, vol. 2, pp. 265-272, Jul. 7-11, 2008.*

Seth Kelby Vidal, "Systems and Methods for Initiating Software Repairs in Conjuction With Software Package Updates", U.S. Appl. No. 12/714,200, filed Feb. 26, 2010.

Seth Kelby Vidal, "Systems and Methods for Diagnostic Notification Via Package Update Manager", U.S. Appl. No. 12/714,258, filed Feb. 26, 2010.

Seth Kelby Vidal, "Systems and Methods for Managing Software Package Updates Using Communication Pipes", U.S. Appl. No. 12/714,208, filed Feb. 26, 2010.

Seth Kelby Vidal, "Systems and Methods for Generating and Storing Translation Information as Package Metadata", U.S. Appl. No. 12/714,171, filed Feb. 26, 2010.

Seth Kelby Vidal, "Systems and Methods for Generating Predictive Diagnostics via Package Update Manager", U.S. Appl. No. 12/714,222, filed Feb. 26, 2010.

James Antill, "Systems and Methods for Defining and Enforcing Access Policy for Package Update Processes", U.S. Appl. No. 12/873,860, filed Sep. 1, 2010.

Seth Kelby Vidal, "Systems and Methods for Generating Cached Representations of Encoded Package Profile", U.S. Appl. No. 12/788,139, filed May 26, 2010.

Seth Kelby Vidal, "Systems and Methods for Generating Cached Representations of Host Package Inventories in Remote Package Repositories", U.S. Appl. No. 12/790,699, filed May 28, 2010.

Seth Kelby Vidal, "Systems and Methods for Generating Package Profiles in Software Package Repositories Using Selective Subsets of Packages", U.S. Appl. No. 12/873,557, filed Sep. 1, 2010.

Seth Kelby Vidal, "Systems and Methods for Managing Versions of Software Packages", U.S. Appl. No. 13/037,363, filed Mar. 1, 2011.

Seth Kelby Vidal, "Systems and Methods for Restoring Machine State History Related to Detected Faults in Package Update Process", U.S. Appl. No. 12/788,036, filed May 26, 2010.

Seth Kelby Vidal, "Systems and Methods for Generating Client Qualification to Execute Package Update Manager", U.S. Appl. No. 12/788,458, filed May 27, 2010.

Seth Keiby Vidal, "Systems and Methods for Determining When to Update a Package Manager Software", U.S. Appl. No. 12/790,752, filed May 28, 2010.

Seth Kelby Vidal, "Systems and Methods for Generating Exportable Encoded Identifications of Networked Machines Based on Installed Package Profiles", U.S. Appl. No. 12/768,416, filed Apr. 27, 2010.

Seth Kelby Vidal, "Systems and Methods for Tracking Computing Systems Utilizing Software Repositories", U.S. Appl. No. 12/955,671, filed Nov. 29, 2010.

Seth Keiby Vidal, "Systems and Methods for Automatic Upgrade and Downgrade in Package Update Operations", U.S. Appl. No. 12/892,227, filed Sep. 28, 2010.

Seth Kelby Vidal, "Systems and Methods for Detection of Malicious Software Packages", U.S. Appl. No. 12/895,876, filed Oct. 6, 2010.

Seth Kelby Vidal, "Systems and Methods for Space Efficient Software Package Management", U.S. Appl. No. 12/610,006, filed Oct. 30, 2009.

* cited by examiner

PACKAGE ASSOCIATION TABLE

| PROCESS ID | INIT. TIME | MEMORY USED | OPEN PORTS | EXECUTABLE FILE NAME | ASSOCIATED PACKAGE ID | DEPENDENCIES | OTHER ATTRIBUTES |
|---|---|---|---|---|---|---|---|
| PROCESS 1 | 5/1/10 1:45 | 1350X3 | 110 | MESSENGER.EXE | PROCESS 120 | TEXT.EXE | |
| PROCESS 2 | 5/1/10 2:40 | 10150X8 | 98 | SPREADSHEET.EXE | PACKAGE 306 | REPORTGEN.EXE | |
| ... | | | | ... | | | ... |
| PROCESS X | | | | | | | |

REPO.

GENERATING AN ENCODED PACKAGE PROFILE BASED ON EXECUTING HOST PROCESSES

FIELD

The present teachings relate to systems and methods for generating an encoded package profile based on executing host processes, and more particularly, to platforms and techniques for inspecting a host machine to identify installed software packages corresponding to one or more executing application or other active processes, and generating an encoded profile or identification of that package or packages corresponding to the executing processes.

BACKGROUND OF RELATED ART

Users of physical or virtual machines commonly install software packages, including package updates, to physical or virtual machines. The software packages can each contain a set of component files chosen to perform a given application or task, such as, for example, a group of software applications, drivers, and/or other resources used to install and use messaging or media applications. In instances, a software package can contain application software, operating system software, drivers, patches, and/or other software components grouped as a logical set. The package itself can be formatted in different formats, including, for instance, as a single file entity, in a compressed format, and/or in other data formats.

Software package update managers exist to help a user initiate and perform software package updates, such as, for example, the "yum" (Yellowdog update manager) package manager available from Red Hat, Inc., Raleigh, N.C., and others. In general, available software package managers are configured to interact with the set of installed packages on a client and with one or more software package repositories, to directly connect to those databases and download available package updates.

The process of initiating software package updates can involve, however, complications such as installation-related software faults. Those irregularities can occur in various scenarios, including in the context of preparing package updates to distribute to machines in a managed network. For instance, in a managed network which operates a comparatively large number of machines, at any given time some of the client or target machines may be currently executing the application or other software which is the object of an intended package update. A systems administrator may have to learn which machines contain those currently executing applications, in order to identify those machines and terminate the application or reboot the machine, in order to start a subsequent package update process. Current package management platforms may not contain the capability to identify machines containing an arbitrary selected package whose associated application is running, on an on-the-fly basis.

Similarly, an administrator may at times wish to identify the packages for the currently executing processes on any machines in a managed network, for instance to perform a security audit after a threat is detected which has infected a specific application, or for other purposes.

Yet further, managed networks may exist or operate in which the client or host machines scheduled to receive package updates do not themselves physically store the associated packages, such as may be the case for virtual machines in cloud-based networks which do not host or provide disk or other storage for the client population. In that case, an administrator of the set of virtual machines may need to interrogate the machines to identify the executing processes of those virtual machines, and then determine the subscribed packages corresponding to those processes since direct inspection of stored package objects is not possible.

Existing package update managers may not contain tools or processes to assist in performing audits of executing processes associated with installed packages in these and other scenarios. It may be desirable to provide systems and methods for generating an encoded package profile based on executing host processes, in which an administrator or other user can discover the currently executing applications or other processes on a client machine or machines, determine the corresponding software package or packages corresponding to those processes, encode that package complement, and potentially perform package update and/or other configuration management operations on the client machine(s).

DESCRIPTION OF DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for generating an encoded package profile based on executing host processes. More particularly, embodiments related to platforms and techniques for identifying a set of executing processes which are currently running or executing on a host, target, or client machine or machines. In aspects, the set of executing processes on the client can be identified by a package manager hosted on the client machine, and/or by the package manager interacting with the operating system of the client machine. The set of executing processes can, for instance, comprise threads or services associated with one or more applications, or other software executing on the client.

In aspects, the package manager and/or other logic can associate each process in the set of executing processes with one or more packages installed on or subscribed to by the client. Once the packages corresponding to the executing processes are identified, the package manager and/or other logic can encode a profile or identifier of the set of packages corresponding to the currently executing processes. The encoded identifier can be generated, for instance, by performing a hash function on the packages names, process or application names, version numbers, package dates, and/or other package attributes or data. The package manager and/or other logic can then transmit the encoded identifier of the package or packages corresponding to the set of executing processes to a remote management platform, such as a package server, and/or other network management platform.

In aspects, the package server or other remote management platform can then perform package update operations on the client machine, including for instance to send a configuration command to the client to terminate the executing processes corresponding to packages to be updated. The package server can then initiate installation processes on the client to update that package or package. In aspects, the package server can likewise perform other management actions on the client, including for instance performing security operations on the client, network management on the client such as grouping or associating clients having the same set of executing processes, and/or taking other actions or performing other activities. In aspects, the image or profile of the client or clients whose set of executing processes and associated packages have been captured can be stored to local or remote storage, for further updating or other activity.

These and other embodiments described herein address the various noted shortcomings in known package update technology, and provide a user with enhanced package and system management capability for installing their software package resources with less potential for software conflicts, errors, or other undesirable results of updating activity.

Reference will now be made in detail to exemplary embodiments of the present teachings, which are illustrated in the accompanying drawings. Where possible the same reference numbers will be used throughout the drawings to refer to the same or like parts.

Figure 1:
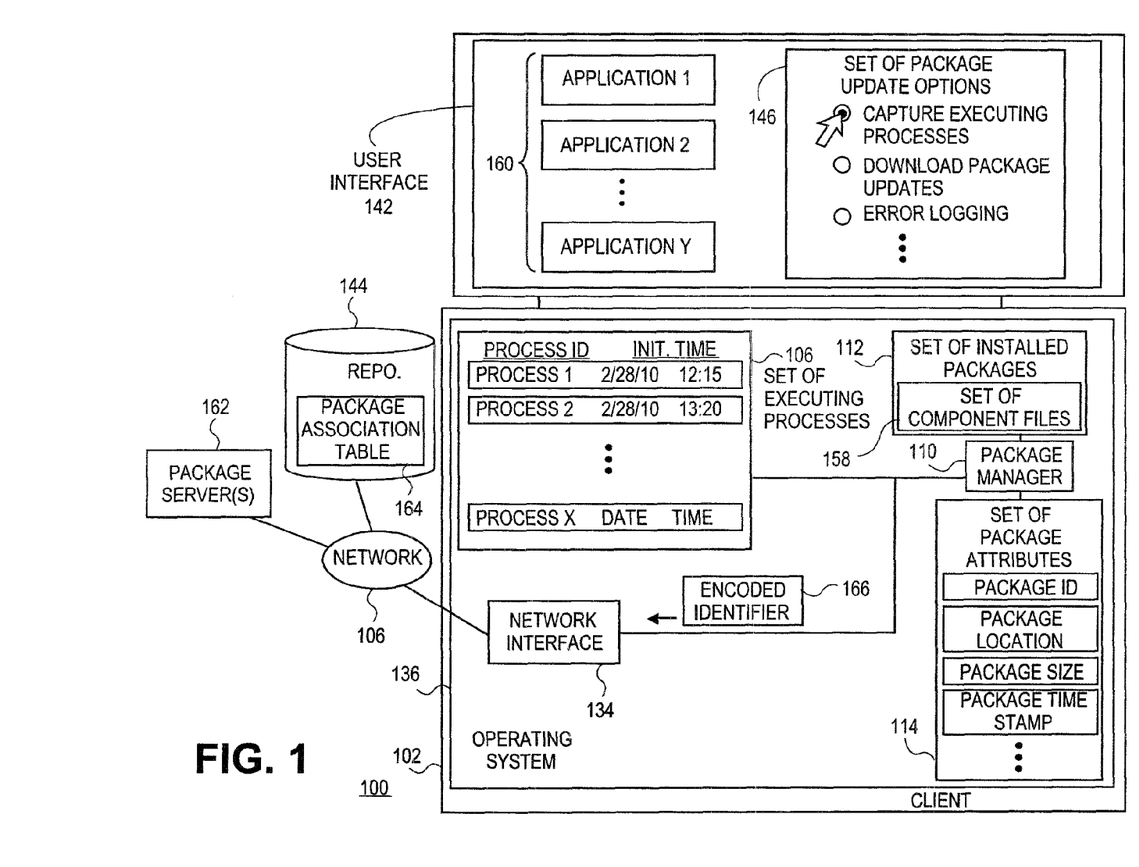
FIG. 1 illustrates an overall network in which systems and methods for generating an encoded package profile based on executing host processes can be implemented, according to various embodiments.

FIG. 1 illustrates an exemplary system 100 in which systems and methods for generating an encoded package profile based on executing host processes can be implemented, according to various embodiments. In embodiments as shown, one or more clients 102 can store, execute, and otherwise host a variety of resources including a package manager 110 configured to communicate with a set of installed software packages 112, and other hardware, software, and resources of the one or more clients 102. In embodiments, the package manager 110 can be or include a software application, a utility, an application programming interface (API) to an operating system 136 of the one or more clients 102, a service, and/or other local or remote logic or resources. According to embodiments, the package manager 110 can access and manage the set of installed software packages 112 to run, edit, update, configure, and otherwise manage one or more software packages hosted or installed in the one or more clients 102. The set of installed software packages 112 and/or updates to those packages may be referred to together herein as a "software package update." In aspects, the package manager 110 can be or include one or more commercially and/or publicly available package manager applications or resources, such as the "yum" package update manager available from Red Hat, Inc., Raleigh, N.C., based on or compatible with the Red Hat package manager (rpm) platform, or others.

In aspects as shown in FIG. 1, the set of installed software packages 112 can be or include packages which comprise the executable files and/or other files or data associated with a set of applications 160 installed on the one or more clients 102. The set of applications 160 can be or include any application, operating system, utility, and/or other software, such as, for example, messaging applications, spreadsheet or modeling applications, media applications, social networking applications, database applications, word processing applications, and/or other applications or utilities, and can in aspects include an operating system, drivers, and/or components thereof. The set of applications 160 can have an associated set of executing processes 106 corresponding to the processes spawned by the run-time executables for those applications, and can include, for instance, processes, threads, services, and/or other executing software resources to carry out and support the set of applications 160 while in use. The set of installed software packages 112 can each contain a set of component files 158 comprising for example the operating system, application, and/or other executable files and/or other files or data making up each individual package in the set of installed software packages 112. Each package in the set of installed software packages 112 can have an associated set of package attributes 114 which encodes or records package and/or file names, package and/or component file sizes, versions, dates, software requirements, an/or other attributes related to the software packages and their updates installed on the one or more clients 102, and reflected in the set of installed software packages 112.

In aspects, the package manager 110 can communicate with a network interface 134, such as an Ethernet™ card or port, configured to connect to one or more networks 106, such as the public Internet, or other public or private networks. The package manager 110 can thereby connect to one or more package servers 162 and associated one or more package repositories 144 hosting software packages including software package updates, operating system resources, and/or other software or resources for distribution and installation of those software packages.

In aspects, in general, the package manager 110 can interact with the set of installed software packages 112, the one or more package servers 162 and associated one or more package repositories 144 to identify, inventory, configure, test, update, and/or otherwise manage the set of installed software packages 112 operating on the one or more clients 102. The package manager 110 can, for example, provide a user with a set of package update options 146 displayed via user interface 142, such as a graphical user interface or others, to select various inventorying, test, update, configuration, and/or other management activities on the set of installed software packages 112. The set of package update options 146 can include selections for the installation and/or updating of one or more installed packages, various installation options such as file locations and others, and/or other options or parameters for the downloading of software package updates from the one or more package repositories 144 to the set of installed software packages 112 of the one or more clients 102.

The package manager 110 can also access the set of installed software packages 112 of the one or more clients 102, and perform discovery and inventory operations on the set of executing processes 106 hosted and running on the one or more clients 102. The package manager 110 can perform those discovery and inventory operations to extract and identify the packages on that machine or machines which have contributed executable files that, in turn, have spawned the set of executing processes 106. In connection with determining those packages in the set of installed software packages 112 responsible for the executable files which have spawned or instantiated the set of executing processes 106, the package manager 110 and/or other logic can interface to the operating system 136 of the one or more clients 102, for instance via through an application programming interface (API) of the operating system 136. The operating system 136 may for instance present an application programming interface (API) to allow the package manager 110 to request an enumeration of the currently executing threads, tasks, images, services, and/or other processes reflecting the set of executing processes 106 currently executing or running on the one or more clients 102. In aspects, the list of the set of executing processes 106 may be accessed or requested via a task scheduler or manager of the operating system 136, and/or via other interfaces or resources.

In general, the package manager 110 and/or other logic can associate the set of executing processes 106 with one or more packages in the set of installed software packages 112 installed on the one or more clients 102, and generate an encoded identifier 166 of those packages to transmit to the one or more package servers 162, and/or other remote management platforms or services. In aspects, the encoded identifier 166 can represent a hashed output based on any one or more of the set of attributes 114 of the identified packages, and/or can be encapsulated or encoded using other techniques. The one or more package servers 162 and/or other remote management platforms or services receiving the encoded identifier 166 can, in aspects, decode the encoded identifier 166, and determine those packages in the set of installed software packages 112 of the one or more clients 102 which contain, which have contributed, or are otherwise associated with the set of executing processes 106. The association between executing files and the packages from which those files were installed can for example be stored and accessed from a package association table 164 stored in the one or more repositories 144, and/or other local or remote storage. The information in the package association table 164 can be built and maintained by the one or more package servers 162, and/or can be imported from other data stores or sources. The one or more package servers 162 and/or other logic can then used the decoded package information to perform various management or configuration operations on the one or more clients 102, singly or collectively, based on the discovered inventory of packages corresponding to the set of executing processes 106 on the one or more clients 102. For instance, the one or more package servers 162 can identify the presence of one or more packages in the set of installed software packages 112 scheduled for a package update, but whose associated executable files are currently running in an active execution state. To avoid faults in attempted updates on those or other machines, the one or more package servers 162 and/or other logic can transmit a command to the affected client(s) in the one or more clients 102, to terminate the set of executing processes 106, and potentially reboot those machines for package installation activity, as appropriate. Upon completion of those operations, update operations on those machines may proceed, since the packages and associated executable files can be more safely updated or replaced.

In aspects, the set of package servers 162 and/or other remote management platforms can generate further or additional management operations based on the encoded identifier 166 of the packages corresponding to the set of executing processes 106. As one further example, in cases where the one or more clients 102 comprise virtual machines in a cloud-based network or other virtual network as part of managed network 100, machines having a matching or identical encoded identifier 166 can be grouped or configured together, for instance, to impose security policies, perform package updates, and/or perform other management activity on a collective basis. Other configuration and/or management activities can be performed on the one or more clients 102 based on the encoded identifier 166 and related data.

Figure 2:
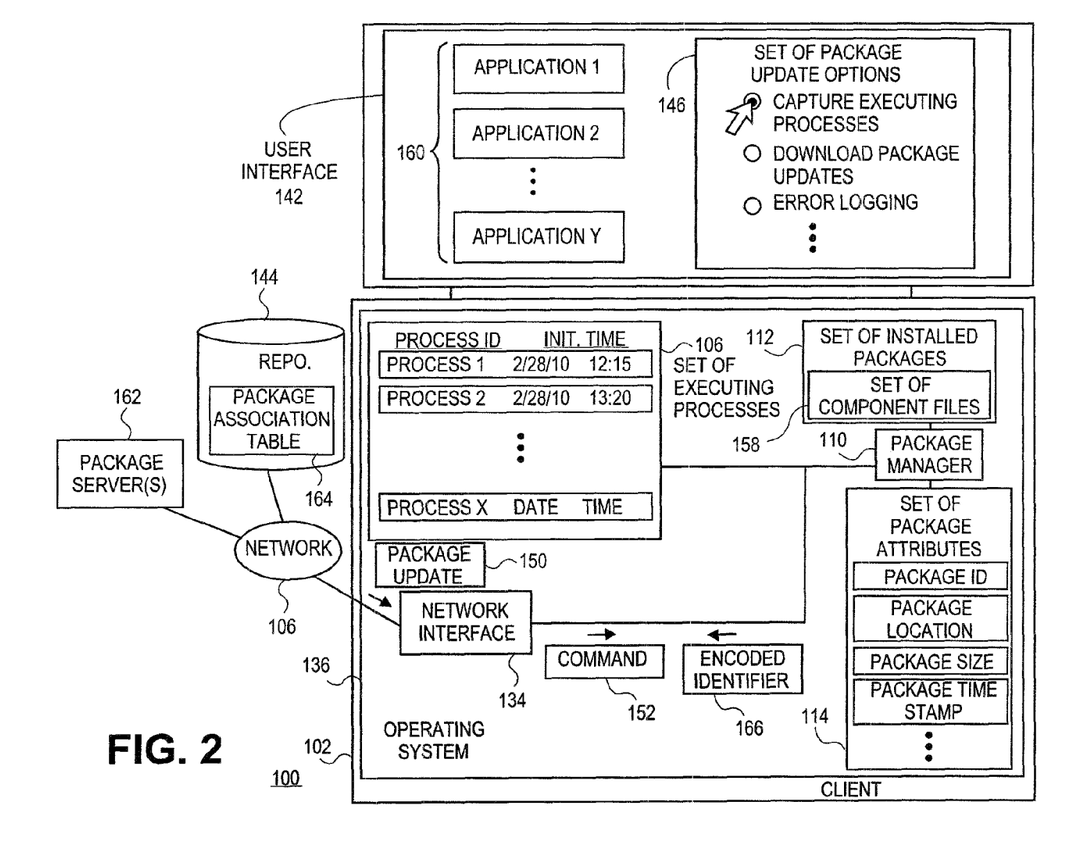
FIG. 2 illustrates an overall network in which systems and methods for generating an encoded package profile based on executing host processes can be implemented, according to various embodiments in further regards.

As illustrated for example more particularly in FIG. 2, the package manager 110 can connect to one or more package servers 162 and associated one or more package repositories 144 via one or more networks 106. The package manager 110 can present and carry out any selected actions based on the set of update options 146 and/or other criteria to initiate and conduct package management activity. The package manager 110 can for instance initiate discovery and inventory activity on the one or more clients 102 to generate the encoded identifier 166 representing those packages having a set of component files 158 which in turn correspond to the set of executing processes 106. The package manager 110 can, as noted, access the set of executing processes 106 of the one or more clients 102 via the operating system 136 of that machine or machines, to locate the package or packages having executable files corresponding to the set of executing processes 106. The one or more package servers 162 can then take a variety of package management actions based on the encoded identifier 166 of those packages. For instance, the one or more package servers 162 can determine that one or more packages scheduled or identified for update activity has spawned a currently executing process in set of executing processes. The one or more package servers 162 can, in such cases, issue a command 152 to terminate that process or processes, in order to then initiate the distribution and installation of a package update 150 to the associated one or more clients 102. Other actions can be taken by the one or more package servers 162, and/or other remote management platforms or logic.

In aspects as also shown, the one or more package servers 162 can identify packages corresponding to the set of executing processes 106 by accessing and/or performing a look-up in a record such as a package association table 164. The package association table 164 can be built and maintained by the one or more packager servers 162 and/or other remote management platform over time, accumulating information related to the package resources and machine state of the one or more clients 102 of the managed network 100. In aspects, the package association table 164 and/or other records representing the set of installed software packages 112, the set of executing processes 106, and/or other resources of the one or more clients 102 can be hosted or stored in the one or more repositories 144, and/or in other local or remote storage.

Figure 3:
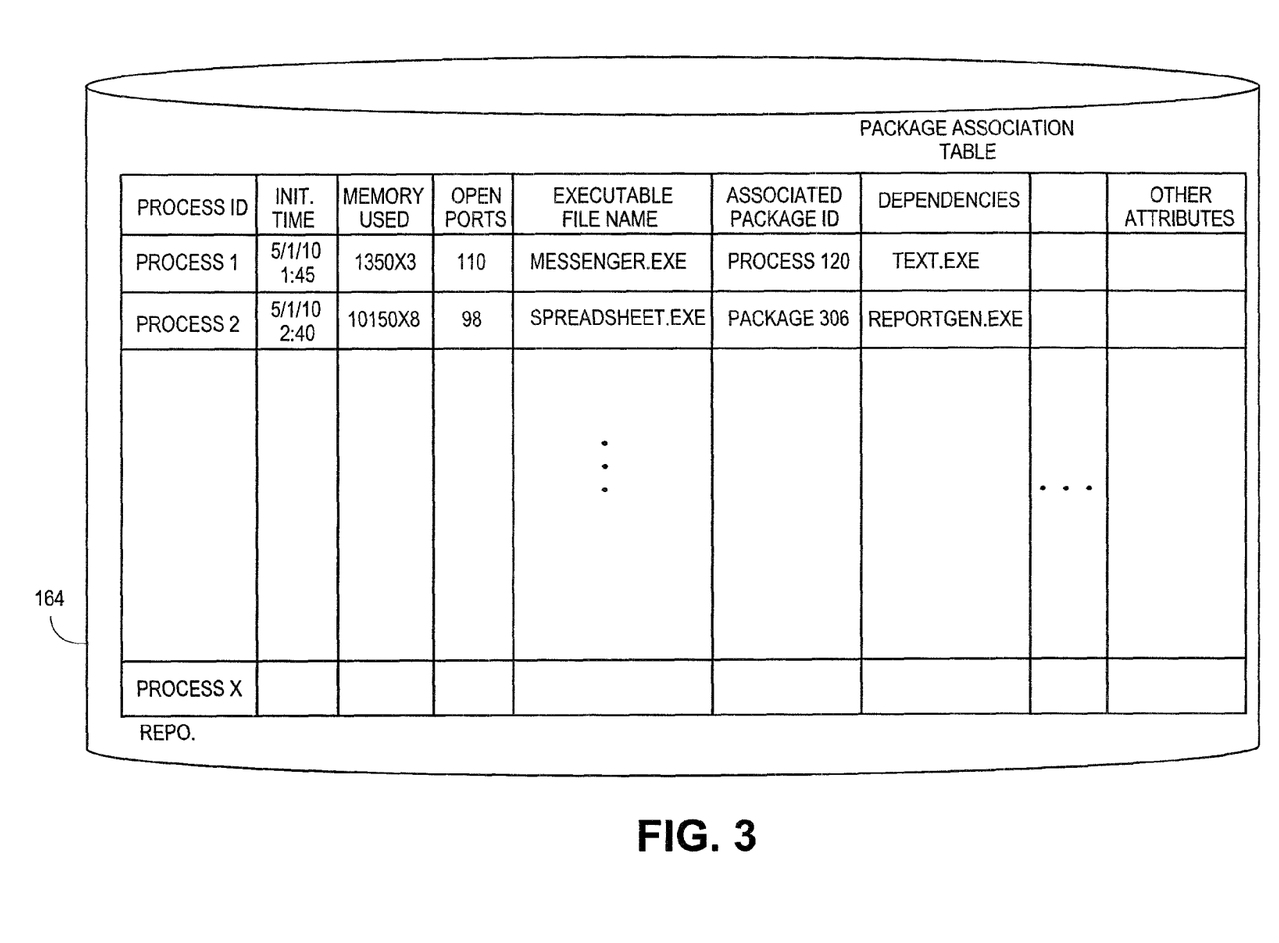
FIG. 3 illustrates an exemplary package association table that can be used to correlate installed packages with a set of executing processes on a client machine, according to various embodiments.

In terms of the data encoding the package association table 164, FIG. 3 illustrates an exemplary configuration of the package association table 164 that may be used in embodiments of systems and methods for generating an encoded package profile based on executing host processes to correlate the set of executing processes 106 and packages in the set of installed software packages 112. The package association table 164 can capture, receive, record, and associate various fields, variables, attributes, and/or other data representing the state of the one or more clients 102 and their machine package resources, as well as information identifying currently executing threads or other processes in the set of executing processes 106. The package association table 164 can for instance record an identification and any related attributes of the set of installed software packages 112, the set of executing processes 106, all packages associated with or related to those processes, and/or other package-related objects or resources of the one or more clients 102. In aspects as shown, the package association table 164 can be accessed by the one or more package servers 162, and/or other logic. The package association table 164 can in instances as shown comprise a set of fields or records including the process IDs of the set of executing processes 106 that have been last captured or recorded as of the most recent inspection or reporting event of the one or more clients 102. In aspects as noted, the process IDs can be or include the names of threads and/or other executing processes reported by the operating system 136 of the one or more clients. The package association table 164 can capture and store other fields or attributes related to the set of executing processes 106, for instance, the initialization or start time of those processes, the memory used by those processes, the communications ports used or being held in an open state by those processes, and/or other data or fields. In aspects, the package association table 164 can likewise store data or objects including an executable file name corresponding to each individual process ID, as well as an associated package ID reflecting the package from which that executable file was extracted or installed.

In aspects, as generally shown, the package association table 164 can likewise store further fields, functions, rules, and/or other attributes, of the recorded packages and/or component files, such as version numbers, epochs, timestamps, and/or other fields, and/or functional data. Functional data can include a dependency field identifying any one or more other downstream processes that may depend on a currently executing process in set of executing processes 106. While a number of fields, attributes, and/or other data are shown, it will be appreciated that other attributes, values, functions, data, and/or other information can be stored in the package association table 164 and be used to identify package(s) corresponding to any currently executing process in set of executing processes 106. In aspects, the package association table 164 can be stored by the one or more package servers 162 in the corresponding one or more repositories 144, or can be stored in other local or remote storage.

Figure 4:
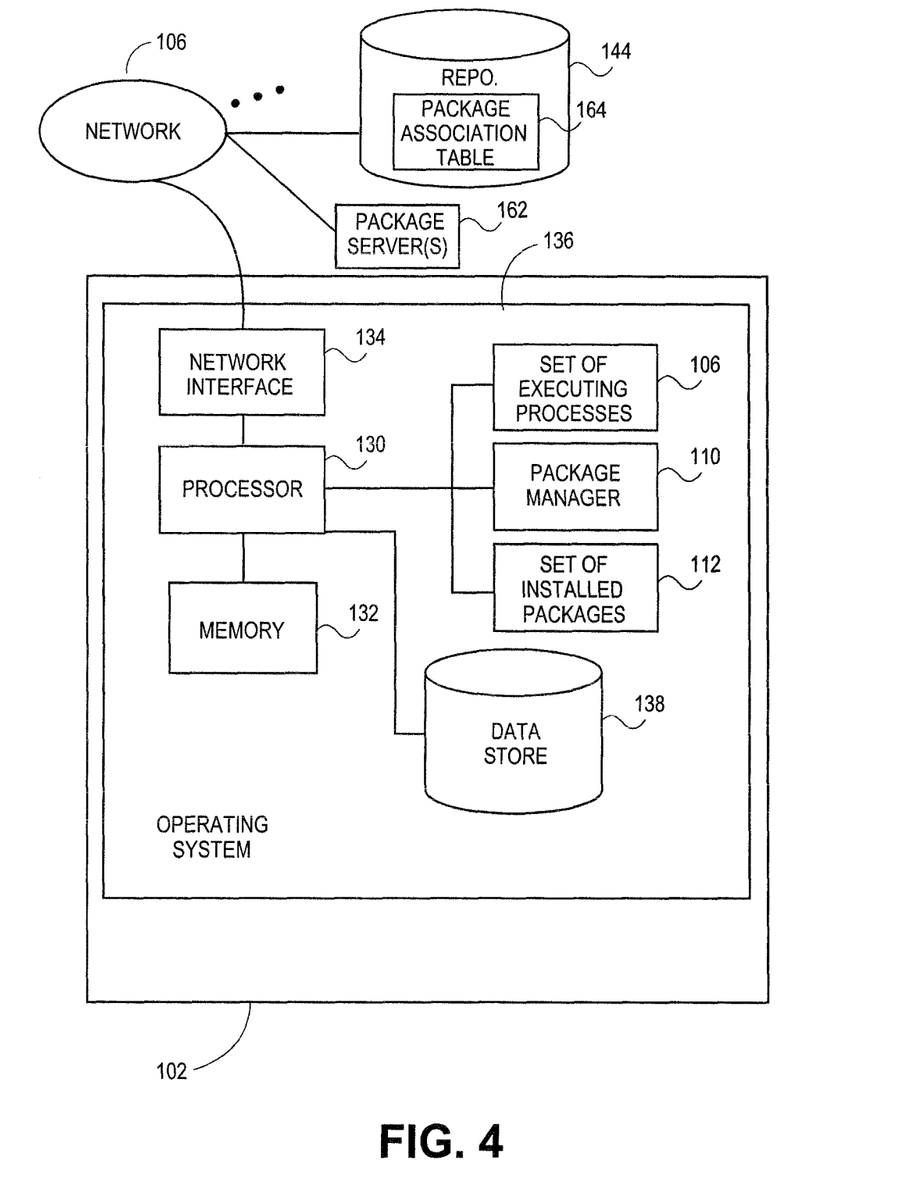
FIG. 4 illustrates exemplary hardware and other resources of a client machine that can be used in systems and methods for generating an encoded package profile based on executing host processes, according to various embodiments.

FIG. 4 illustrates an exemplary diagram of hardware and other resources that can be incorporated in the one or more clients 102 configured to manage, analyze, test and configure the set of executing processes 106, the set of installed software packages 112 and other resources, according to embodiments. In embodiments as shown, the one or more clients 102 can each comprise a processor 130 communicating with memory 132, such as electronic random access memory, operating under control of or in conjunction with the operating system 136. The operating system 136 can be, for example, a distribution of the Linux™ operating system, the Unix™ operating system, or other open-source or proprietary operating system or platform. The processor 130 also communicates with a data store 138, such as a database stored on a local hard drive. The processor 130 further can also communicate with a network interface 134, such as an Ethernet or wireless data connection, which in turn communicates with one or more networks 106, such as the Internet or other public or private networks. The processor 130 also communicates with the package manager 110, the set of executing processes 106, the one or more repositories 144, the package association table 164, and/or other resources to execute control logic and control the inventorying, updating, installation, analysis and management of software packages and their associated processes on the one or more clients 102. Other configurations of the one or more clients 102, including processor and memory resources, associated network connections, and other hardware and software resources are possible. It may be noted that in aspects, hardware configurations of the one or more servers 162 can be similar to those of the one or more clients 102, or can include additional or other features such as redundant storage or other resources.

Figure 5:
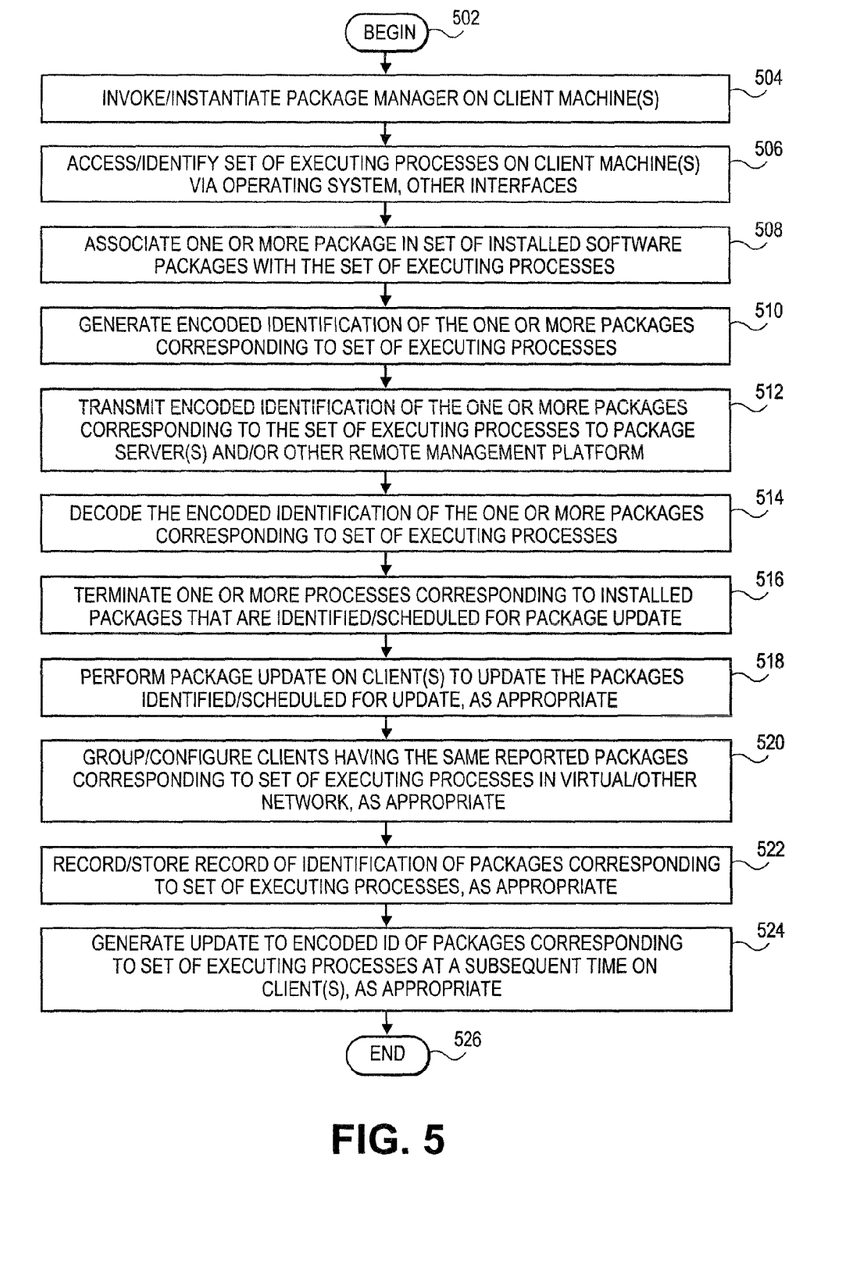
FIG. 5 illustrates a flowchart of processing for the detection of executing processes and software packages that can be used in systems and methods for generating an encoded package profile based on executing host processes, according to various embodiments.

FIG. 5 illustrates a flow diagram of overall processing to track, monitor, and manage the set of executing processes 106, the set of installed software packages 112, the encoded identifier 166, and/or other associated client system resources or conditions, according to various embodiments. In 502, processing can begin. In 504, a user can invoke or instantiate the package manager 110 on the one or more clients 102 to perform software package update maintenance, testing, and other management activity. In 506, the package manager 110 and/or other logic can access and/or identify the set of executing processes 106 on the one or more clients 102 via the operating system 136 and/or other interfaces or resources of the one or more clients 102. In aspects, for instance, the package manager 110 and/or other logic can perform calls to an application programming interface (API) of the operating system 136 and request a list of currently executing threads, applications, services, and/or other processes that are operating on the one or more clients 102. In aspects, other resources or interfaces of the operating system 136, and/or other software or logic can be accessed to identify the set of executing processes on the one or more clients 102.

In 508, the package manager 110 and/or other logic can associate one or more package in the set of installed software packages 112 with the set of executing processes 106 currently operating or executing on the one or more clients 102. For instance, the package manager 110 can access the package association table 164 to perform a look-up of the package or packages containing the process IDs, names of executable files, and/or other identifiers or attributes of files contained in the set of executing processes 106. In cases where a currently executing process is registered to or contained in more than one package, all packages containing the executable files or other resources corresponding to that process can be identified. In 510, the package manager 110 and/or other logic can generate an encoded identifier 166 of the package or packages corresponding to the set of executing processes 106 currently running on the one or more clients 102. In aspects, the encoded identifier 166 can be or include a hash output generated by applying a hash function to package names, sizes, and/or other attributes reflected in the set of package attributes 114 of the subject packages. In aspects when a hash function is applied, that function can be or include hash operations such as secure hash algorithm version 1 (SHA 1), secure hash algorithm version 2 (SHA 2), secure hash algorithm version 3 (SHA 3), and/or other hashing algorithms or protocols known to those skilled in the art. In aspects, other types of encoding other than hash algorithms can be used, or, in aspects, encoded identification 166 can be transmitted in a partially encoded, and/or other format.

In aspects, the encoded identifier 166 can comprise a single encoded object or identifier which encodes or encapsulates all packages in the set of installed software packages 112 corresponding to the set of executing processes 106. In aspects, the encoded identifier 166 can comprise multiple encoded objects or identifiers which each of which separately encodes or encapsulates one or more packages in the set of installed software packages 112 corresponding to the set of executing processes 106. In aspects in general, the encoded identifier 166 can thereby represent a profile, identification, and/or enumeration of the packages in the set of installed software packages 112 on the one or more clients 102 which contribute executable files, services, and/or other resources to the set of executing processes 106 of the one or more clients 102 which are active and running at the time of the inspection or reporting of those processes.

In 512, the package manager 110 and/or other logic can transmit the encoded identifier 166 of the package or packages corresponding to the set of executing processes 106 to the one or more package servers 162, and/or other remote management platform. In aspects, besides or in addition to the one or more package servers 162, the encoded identifier 166 can be transmitted, for instance, to a network management platform, such as a network configuration and/or security platform, and/or other server, platform or service. In 514, the one or more package servers 162 and/or other remote management platform or logic can decode the encoded identifier 166 of the one or more packages corresponding to the set of executing processes 106 on the one or more clients 102. The encoded identifier 166 can for instance be decoded by various methods, such as by performing a look-up against a hash table, and/or performing other decoding processes on encoded identifier 166. In 516, the package manager 110 on the one or more clients 102 can terminate the one or more processes in the set of executing processes 106 which are identified and/or scheduled for an update, and/or which are identified to be terminated or suspended for other reasons. In aspects, the package manager 110 can terminate the one or more processes whose associated package(s) in the set of installed software packages 112 are scheduled for an update or other maintenance after receiving a configuration command or other data transmitted to the corresponding one or more clients 102 by the one or more package servers 162. In 518, the package manager 110 can perform a package update on the associated one or more clients 102 to update the identified package(s), whether to prepare a scheduled update or otherwise, as appropriate. In aspects, the package manager 110 can access and download the appropriate package version via the one or more package servers 162 and the corresponding one or more repositories 144 to perform the update, maintenance, and/or other activity.

In 520, the one or more package servers 162 and/or other remote management platform, the package manager 110, and/or other logic can group and/or configure all clients in the one or more clients 102 which have the same reported packages as reflected in encoded identifier 166, corresponding to the same set of executing processes 106 in managed network 100, into a set of grouped targets or other machines, as appropriate. In aspects, it may be desirable to identify those machines in the one or more clients 102 having the same set of executing processes 106 in cases where managed network 100 comprises a virtual and/or cloud network, and the one or more client machines 102 comprise virtual machines. In such cases, performing a discovery process to locate machines having the same set of executing processes 106 may serve to locate, identify, and group machines for collective management activity, such as pushing a package update or installing new packages to those grouped or related machines, as appropriate. In 524, the package manager 110 and/or other logic can generate an updated encoded identifier 166 reflecting packages corresponding to the set of executing processes 106 on the one or more clients 102 at a subsequent time on those client or clients, as appropriate. For instance, the package manager 110 can maintain a daily, weekly, monthly, or other schedule with which to sample the set of executing processes 106 on the one or more clients 102 for inventorying, updating, and/or other purposes. In 526, as understood by persons skilled in the art, processing can return to a prior processing point, jump to a further processing point, or end.

The foregoing description is illustrative, and variations in configuration and implementation may occur to persons skilled in the art. For example, while embodiments have been described in which one package manager 110 is configured to control package enumeration and update activity, including the generation of the encoded identifier 166, in embodiments, multiple package managers and/or other applications, software, or logic can interact to control the downloading, installation, testing, and other management of software packages to one or more client or other machines. For further example, while embodiments have been described in which package update activity is conducted on one client in the one or more clients 102, in embodiments, multiple local or remote targets, clients, and/or other machines can register to one or more images of package manager 110 and/or other logic or resources, to identify executing processes, identify corresponding package inventories, and/or to receive or perform package update or other management activity. Other resources described as singular or integrated can in embodiments be plural or distributed, and resources described as multiple or distributed can in embodiments be combined. The scope of the present teachings is accordingly intended to be limited only by the following claims.

What is claimed is:

1. A method, comprising:
    identifying a plurality of executing host processes on a client;
    identifying a set of software packages installed on the client that are associated with the plurality of executing processes by accessing package association information from a package association record between the plurality of executing host processes and the set of software packages, wherein the package association record comprises an identification of at least one software package of the set of software packages that is associated with at least one of the plurality of executing host processes and information related to one or more dependencies, a process identification (ID) of each of the plurality of executing host processes, and a package ID for each package of the set of packages; and
    generating, by a processor, an encoded identifier in view of the identified set of software packages that correspond to the plurality of executing host processes on the client.

2. The method of claim 1, wherein the encoded identifier of the set of software packages comprises an encoded identifier in view of a set of attributes associated with the set of software packages.

3. The method of claim 2, wherein the set of attributes comprises at least one of a package name identifier, a package version identifier, a package epoch identifier, a package timestamp identifier, a package size identifier, a file name identifier, a file version identifier, a file timestamp identifier, or a file size identifier.

4. The method of claim 3, wherein the encoded identifier comprises a hash function output generated by performing a hash function on the set of attributes.

5. The method of claim 1, wherein identifying the plurality of executing processes executing on the client comprises accessing an operating system of the client to identify the plurality of executing processes executing on the client.

6. The method of claim 5, wherein the plurality of executing processes comprises an executing thread corresponding to executable files contained in the set of software packages.

7. The method of claim 1, wherein the client comprises at least one of a physical machine or a virtual machine.

8. The method of claim 1, further comprising identifying an updated software package corresponding to a subsequently executing process on the client.

9. The method of claim 1, further comprising determining whether the set of software packages corresponds to a scheduled package update.

10. The method of claim 9, wherein when the set of software packages corresponds to a scheduled package update, the method further comprises terminating the plurality of executing processes corresponding to the set of software packages to permit a package update process to be performed on the set of software packages.

11. The method of claim 1 further comprising transmitting the encoded identifier of the set of software packages to a management platform.

12. A system, comprising:
a data store to store a set of software packages on a client; and
a processor operatively communicably coupled to the data store, and to:
identify a plurality of executing host processes on a client,
identify the set of software packages on the client corresponding to the plurality of executing process on the client by accessing package association information from a package association record between the plurality of executing host processes and the set of software packages, wherein the package association record comprises an identification of at least one software package of the set of software packages that is associated with at least one of the plurality of executing host processes and information related to one or more dependencies, a process identification (ID) of each of the plurality of executing host processes, and a package ID for each package of the set of packages, and
generate an encoded identifier in view of the identified set of software packages that correspond to the plurality of executing host processes on the client.

13. The system of claim 12, wherein the encoded identifier of the set of software packages comprises an encoded identifier in view of a set of attributes associated with the set of software packages.

14. The system of claim 13, wherein the set of attributes comprises at least one of a package name identifier, a package version identifier, a package epoch identifier, a package timestamp identifier, a package size identifier, a file name identifier, a file version identifier, a file timestamp identifier, or a file size identifier.

15. The system of claim 14, wherein when identifying the plurality of executing processes executing on the client, the processor is to access an operating system of the client to identify the plurality of executing processes on the client.

16. The system of claim 15, wherein the plurality of executing processes comprises at least one executing thread corresponding to executable files contained in the set of software packages.

17. The system of claim 12, wherein the client comprises at least one of a physical machine or a virtual machine.

18. The system of claim 12, wherein the processor is further to determine whether the set of software packages corresponds to a scheduled package update.

19. The system of claim 18, wherein when the set of software packages corresponds to a scheduled package update, the processor is further to terminate the plurality of executing processes corresponding to the set of software packages to permit a package update process to be performed on the set of software packages.

20. A non-transitory computer readable storage medium including instructions that, when executed by a processor, cause the processor to:
identify a plurality of executing host processes on a client;
identify a set of software packages installed on the client that are associated with the plurality of executing processes by, wherein the software package comprises a plurality of component files chosen to perform a task, accessing package association information from a package association record between the plurality of executing host processes and the set of software packages, wherein the package association record comprises an identification of at least one software package of the set of software packages that is associated with at least one of the plurality of executing host processes and information related to one or more dependencies, a process identification (ID) of each of the plurality of executing host processes, and a package ID for each package of the set of packages; and
generate, by a processor, an encoded identifier in view of the identified set of software packages that correspond to the plurality of executing host processes on the client.

* * * * *